United States Patent [19]

Gorchev et al.

[11] 4,182,430
[45] Jan. 8, 1980

[54] BRANCH TAKE-OFF AND SILENCER FOR AN AIR DISTRIBUTION SYSTEM

[75] Inventors: Dimiter Gorchev, Boston, Mass.; Karl U. Ingard, Kittery Point, Me.

[73] Assignee: Mitco Corporation, Somerville, Mass.

[21] Appl. No.: 944,133

[22] Filed: Sep. 20, 1978

[51] Int. Cl.² .................................................. E04F 17/04
[52] U.S. Cl. ..................................... 181/224; 181/256; 181/268; 181/275; 98/DIG. 10
[58] Field of Search ............... 181/224, 218, 282, 239; 98/40 B, 40 C, 40 VM, DIG. 10

[56] References Cited

U.S. PATENT DOCUMENTS

| | | | |
|---|---|---|---|
| 2,308,886 | 1/1943 | Mason | 181/224 |
| 3,554,112 | 1/1971 | Herb | 181/224 |
| 3,696,731 | 10/1972 | Tutt | 181/239 |
| 4,050,364 | 9/1977 | Maus | 181/224 |

Primary Examiner—L. T. Hix
Assistant Examiner—Benjamin R. Fuller
Attorney, Agent, or Firm—Kenway & Jenney

[57] ABSTRACT

A branch take-off and silencer apparatus for an air distribution system. The apparatus couples an input duct to one or more branch ducts and to a coaxial output duct having a similar but smaller cross-section than the input duct. Coaxial extensions of the input and output ducts define a shell region. The shell region is closed at its downstream end and open at its upstream end to oncoming air in the input duct. The shell region is divided at that upstream end by porous acoustical material into a plurality of adjacent channels which lead to a plenum near the downstream end of the shell region. The plenum is coupled to the branch ducts.

13 Claims, 9 Drawing Figures

BRANCH TAKE-OFF AND SILENCER FOR AN AIR DISTRIBUTION SYSTEM

BACKGROUND OF THE DISCLOSURE

This invention relates to air distribution systems and more particularly to apparatus for extracting air from a main supply duct to a branch duct.

In a conventional air distribution system in a building, the air is branched from the main air supply duct to the various branch ducts through openings in the wall of the main duct which enter into the branch ducts.

Generally, the volume flow rate through the branch is determined by the static pressure in the main duct and the flow resistance of the branch. Since the branch opening is flush with the wall of the main duct, the dynamic pressure of the flow in the main duct does not contribute to the flow rate in the branch.

In such configurations, the noise level at the entrance to the branch duct is substantially the same as the noise level in the main duct. This level is generated mainly by the air supply fan, which noise travels through the main air duct without much attenuation. In the prior art, to reduce the noise level, a silencer is typically used at the exit of the fan in the main supply duct. Frequently a silencer is also incorporated at the inlet to the main supply fan.

In order to minimize the effects of the silencer on the system, the silencer must have a low pressure drop and its total open area must be large. Thus, if adequate acoustic attenuation is to be achieved, the silencer dimensions must be made quite large. This means that the silencer has the disadvantage, not only of being costly, but also bulky, requiring a large amount of space. If the dimensions of the silencer are reduced, the pressure drop will increase and it may then be necessary to select a larger fan to achieve the required total volume flow rate through the main duct. This latter alternative is extremely costly from an energy standpoint.

In order to further attack the noise problem, silencers may be introduced in the branch ducts, or alternatively, the branch ducts may incorporate noise attenuating liners. If should be kept in mind, however, that in order for such a silencer or liner to be effective at low frequencies, the absorptive elements must be quite thick, and in order for the pressure drop in the branches to be kept to an appropriately low value, the dimensions must be correspondingly large. This leads to impractical distribution systems.

It is an object of the present invention to provide a composite branch duct take-off and silencer.

It is a further object to provide each branch duct with noise attenuation but in such a manner that the dimensions of the ducts remain unchanged.

It is another object to provide a composite branch take-off and silencer, eliminating the need for a silencer at the fan.

Yet another object is to provide a composite branch take-off and silencer providing relatively high air handling capacity and the volume flow in a branch duct.

SUMMARY OF THE INVENTION

Briefly, the present invention is a composite branch take-off and silencer for an air distribution system wherein an airstream from an input duct may be coupled to an output duct and one or more branch ducts. The input and output ducts have a co-linear central axis and similar cross-sectional shapes at the ends to be coupled, with the input duct having a larger cross-sectional area than the output duct. Each branch duct has a central axis at the end to be coupled to airstream in the input duct, which is offset from the common central axis of the input and output ducts.

In accordance with the present invention, an outer section is coupled to the downstream end of the input duct. The outer section has a cross-section substantially the same as the cross-section of the input duct at the downstream end. An inner section is coupled to the upstream end of the output duct. The inner section has a cross-section substantially the same as the cross-section of the output duct at that upstream end. The input and output sections have a common central axis which is co-linear with the central axes of the input and output ducts. The inner section extends into the outer section to define a shell region between the overlapping portions of these sections. The shell region is sealed with a sound absorbent material at the downstream end, i.e. near the output duct. The other end of the shell region is open to receive a portion of the airstream from the input duct. The shell region is divided into a number of adjacent channels extending from a point near the input duct to intermediate points within the shell region. Preferably, the intermediate points are equidistant from the upstream end of the shell region. The portion of the shell region between the intermediate points and the end of the shell region near the output duct forms a common plenum. The plenum is coupled to the branch ducts.

Generally, the channels are formed in the shell region by a plurality of sound-absorbing, elongated, tapered wedges having thickness substantially equal to the distance between the inner and outer sections and extending longitudinally from a point near the upstream end of the shell region to the intermediate points. The wedges are disposed within the shell region in order to establish the channels between adjacent wedges.

In one form of the invention, the inner and outer sections and the input and output ducts are substantially cylindrical, and the tapered wedges are adapted to provide generally helical channels. Each helical channel is characterized by a central axis at an associated intermediate point, which is substantially tangent to a reference plane, where the reference plane passes through the intermediate point and is perpendicular to the common central axis of the inner and outer sections. In this configuration, a substantially circumferential airflow is formed in the plenum from the air tapped through the channels from the input duct. This circumferential airflow is then coupled to the duct branches by means of velocity pressure established in that plenum.

In alternative embodiments, the channels in the shell region may be straight so that a relatively high static pressure is built up in the plenum. In the latter type of configuration, the static pressure drives the airflow tapped from the input duct to the branch ducts. In still other embodiments, the channels in the shell region may lie between the above-noted examples so that a combination of velocity pressure and static pressure may be utilized to drive the tapped airflow into the branch ducts. In still other embodiments, the input and output ducts, and inner and outer sections may have polygonal cross-sections in keeping with the present invention. In all of these embodiments, each channel acts in effect as an acoustically lined duct with the two opposite sides being lined with sound absorbent material, such as glass wool. The dimensions of the channel forming the wedges may be selected to provide attenuation of noise in selected frequency ranges using conventional techniques. All of these configurations are relatively efficient in that the combination branch take-off and silencer requires less space, less driving power, less sheet metal, and generate less noise compared with prior art devices for comparable airflow characteristics.

BRIEF DESCRIPTION OF THE DRAWING

The foregoing and other objects of this invention, the various features thereof, as well as the invention itself, may be more fully understood from the following description when read together with the accompanying drawing in which:

FIGS. 3 and 4 show sectional views of an alternative embodiment of the present invention.

DESCRIPTION OF THE PREFERRED EMBODIMENT

Figure 1:
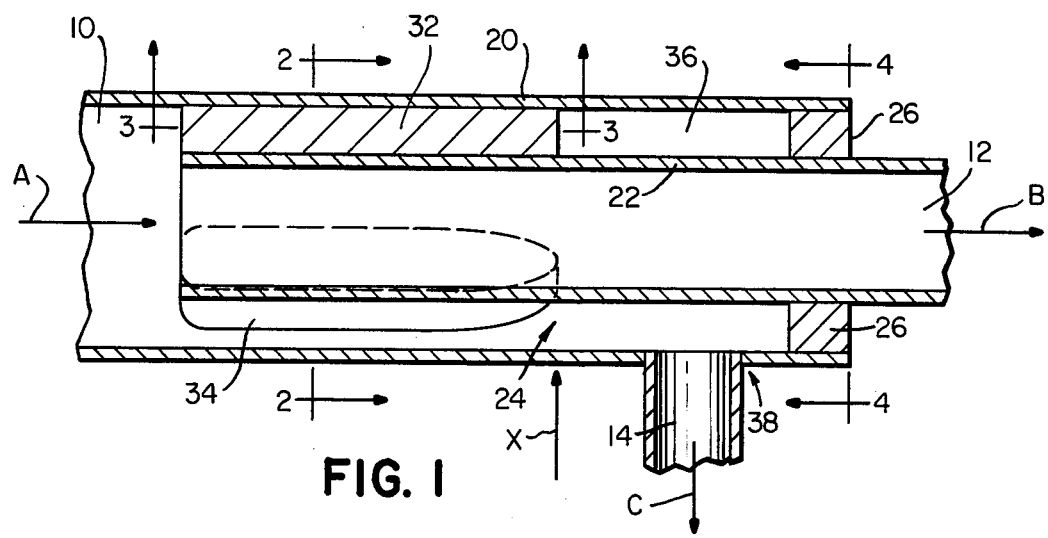
FIG. 1 shows a sectional view of an embodiment of the present invention.
Figure 2:
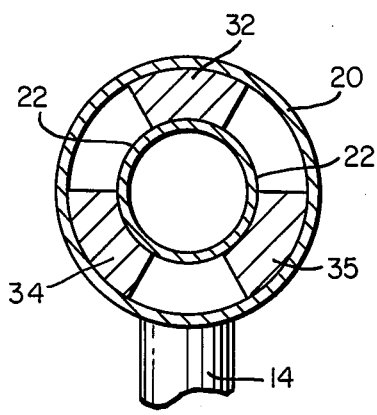
FIGS. 2-4 show sectional views of the embodiment of FIG. 1.
Figure 4:
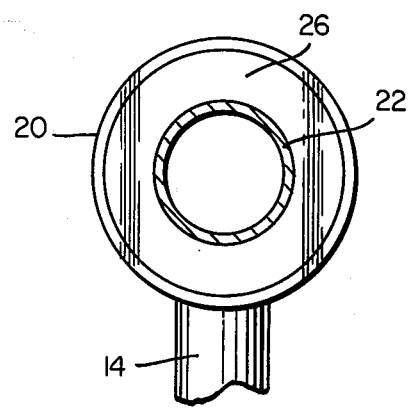
Figure 3:
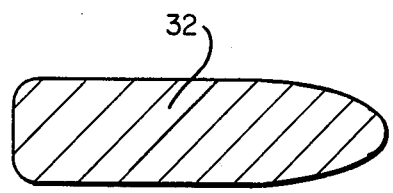

FIG. 1 shows an exemplary branch take-off and silencer for air distribution system having an input duct 10, an output duct 12 and a branch duct 14. Airflow through the apparatus of FIG. 1 is indicated by the arrows A, B and C in that figure. FIGS. 2, 3 show sectional views of the elements of FIG. 1. The elements in FIGS. 2-4 which correspond to elements in FIG. 1 are identified by identical reference numerals.

Ducts 10 and 12 have similar, i.e. same shape, cross-sections. In this example, cross-sections are circular, with the input duct having a relatively large cross-section compared with the output duct. The ducts 10 and 12 are substantially coaxial at the ends to be coupled. In the illustrated embodiment, ducts 10 and 12 overlap. The overlapping portion of duct 10 is referred to hereinafter as the outer section 20 of the invention. The overlapped portion of duct 12 is referred to hereinafter as the inner section 22 of the invention. In the present embodiment, inner and outer sections 20 and 22 are formed by extensions of the respective ducts 10 and 12. In alternative embodiments, sections 20 and 22 may be separate from the ducts 10 and 12 but joined to the respective ducts at the point of overlap.

The shell region between the sections 20 and 22 is referred to generally by reference designation 24 in FIG. 1. In the present embodiment, the shell region 24 is annular. An annular plug 26 provides a seal to the shell region at the downstream end of that region. Plug 26 is a porous acoustical material such as glass wool.

The annular shell region 24 is open at its upstream end to be oncoming airflow in the input duct 10 (indicated by arrow A). The airflow in the shell region 24 exits to the branch duct 14 near the downstream end of region 24. In the illustrated embodiment, the annular region 24 is divided into three adjacent channels which are separated by elongated partitions 32, 34 and 35 of porous acoustical material, such as glass wool. In FIG. 1, only two partitions denoted 32 and 34 are shown, although all three may be seen in FIG. 2. The partitions are generally tapered from upstream to downstream end and have a dimension equal to the radial distance between sections 20 and 22 in the radial direction. The channels extend from a point near the upstream end of sections 20 and 22 to an intermediate point denoted by their reference designation X in FIG. 1 in the region 24. Beyond the channels in region 24 is a substantially annular common plenum 36 which is coupled to the branch duct by means of a butt joint 38.

Each channel acts like an acoustically lined duct, with two opposite sides lined. Since the porous partitions in the annular region 24 can be made quite thick, such as eight inches in typical thirty-six inch diameter duct, the attenuation of the device can be more than adequate throughout the entire frequency range of interest. Thus, the resultant attenuation is comparable to that of a large fan silencer. Unlike the fan silencer, however, the present invention can be increased in length without the need for additional space.

The frequency dependence of the acoustic attenuation of the device may readily be adjusted by variations in the width of the channels (i.e. the distance between the two porous walls in the channel), and the thickness and number of the porous partitions in the annular section. The density of the porous material is also a parameter which can be chosen independently of the others. In the preferred embodiment, the density is selected such that the acoustic flow resistance per inch of the material is between 50 and 10 CGG units, generally corresponding to a density of about six pounds per cubic foot. The required length, L, for the channel is less than ⅓ of the product of the width of the channel, W, and the desired attenuation, A. The details of the frequency dependence of the attenuation may be determined from well-known procedures for lined ducts.

In the illustrated embodiment, the channels in through section 24 are relatively straight. In response to airflow A, a relatively high static pressure is built up in region 36, with this high static pressure driving airflow into the branch duct to form a branch airflow denoted by reference designation C. The remaining portion of the main airflow exits into the output duct and is denoted in FIG. 1 by reference designation B.

Figure 5:
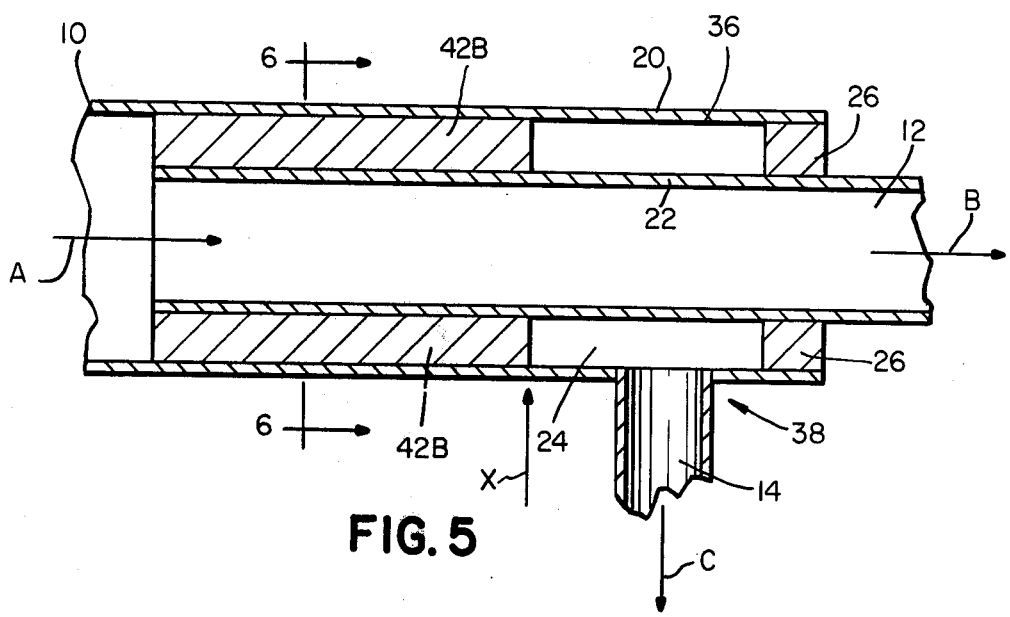
FIGS. 5-7 show sectional views of another embodiment of the present invention.
Figure 6:
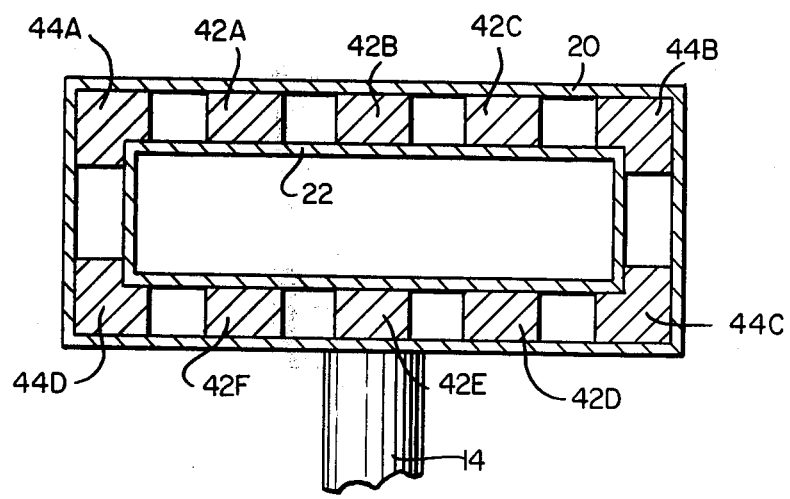

FIGS. 5-6 and FIGS. 7-9 illustrate further embodiments of the present invention. In those figures, elements corresponding to similar elements in the embodiment of FIGS. 1-4 are identified with the same reference designations. FIGS. 5 and 6 show a form of the invention suitable for coupling rectangular input and output ducts. In still other embodiments, ducts may have alternative polygonal cross-section shapes.

In the embodiment of FIGS. 5 and 6, the channel forming members 42A-42F are substantially the same shape as the corresponding member 32 in the above-described embodiment, except the top and bottom surfaces are planar for members 42A-42F in order to provide a flush fit with the inner and outer surfaces of sections 20 and 22, respectively. In FIGS. 5-6, there are four corner channel forming members 44A-44D which extend to the point X as to the members 42A-42F, with the members 44A-44D forming broadening channels for airflow in the shell region 24. The plug 26 has rectangular inner and outer surfaces to provide a seal at the end of the overlapping portions of inner and outer sections 20 and 22.

In operation, the embodiment of FIGS. 5 and 6 operates substantially in the same manner as the embodiment of FIGS. 1-4, with a static pressure build-up in plenum 36 driving airflow tapped from the main stream into the branch duct 14. Similarly, the remaining portion of the main stream is represented by flow arrow B into the output duct 12.

Figure 7:
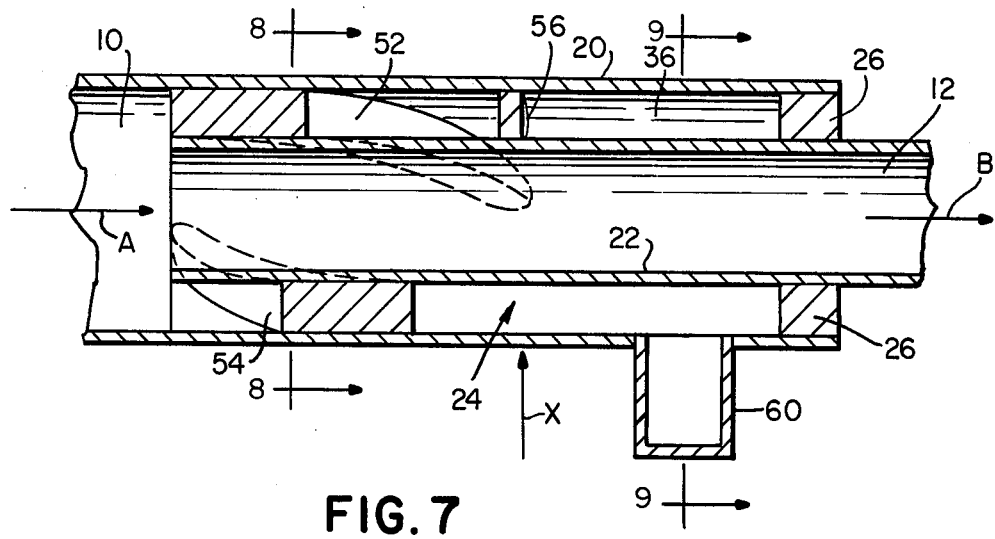
Figure 8:
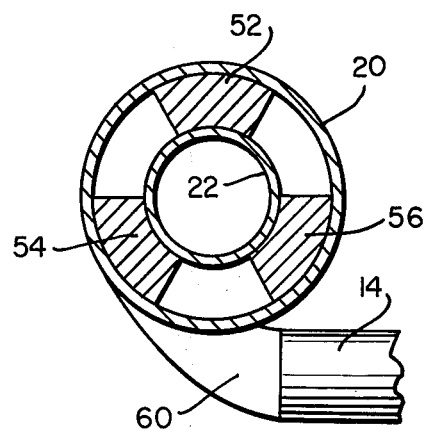
Figure 9:
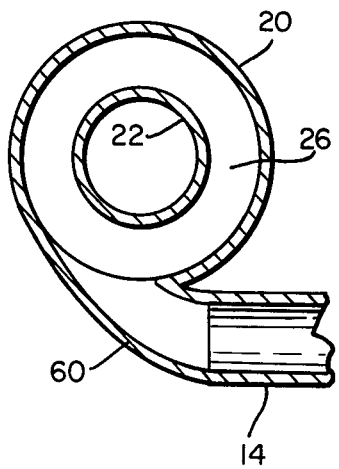

The embodiment of FIGS. 7-9 illustrates another embodiment suitable for coupling an airstream in an input duct 10 (represented by arrow A) to a branch duct 14 (arrow C) with the remainder of the airstream continuing to the output duct 12 (arrow B).

This latter embodiment is substantially similar to that in FIGS. 1-4 except that the partitions 52, 54 and 56 are adapted to form channels in the shell region 24 having substantially helical central axes extending from the portion of the shell region adjacent to input duct 10 to the intermediate point X. At the point X, the central axes of these channels are substantially parallel to a plane passing through point X and being perpendicular to the common axis of sections 20 and 22. Thus, in this embodiment, the channel axes are generally helical with a pitch varying from infinite at the input and to zero at the output end.

With this configuration, air tapped from the input duct 10 and passing through the shell region 24 is directed to flow circumferentially in the plenum 36 (in the counter-clockwise direction viewed from duct 10 in the embodiment of FIG. 7-9). A junction 60 is provided to tap off the airflow from the flow direction in plenum 36 and couple that airflow to the branch duct 14. For this junction, conventional techniques may be utilized, such as those found in centrifugal fans, for example. In this embodiment, the velocity pressure of the airstream moving in the direction flow of plenum 36 drives the tapped air through junction 60 to the branch duct 14. In alternative embodiments, the junction section 60 may provide fully tangential take-off of the airflow from the plenum. In such embodiments the outer wall 61 of section 60 is substantially planar and is tangent to the section 20 where joining that section.

In all the above embodiments, only a single branch duct 14 is illustrated, although in other embodiments, additional branch ducts may be incorporated similarly.

In the illustrated embodiments, the partitions forming the channels are tapered, and provide widening channels in the straight channel embodiments, and substantially uniform width channels in the helical embodiments. In alternative embodiments, the partitions in the shell region may establish the channels having substantially uniform width. In such cases, in helical channel embodiments, the channels are tapered, while in the straight channel embodiments the channels are uniform width.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. Apparatus for coupling an airstream from an input duct to an output duct and one or more branch ducts, said input and output ducts having a common central axis and similar cross-sectional shapes at the ends to be coupled and said input duct having a larger cross-sectional area than said output duct, and said branch ducts having branch axes at the end to be coupled to said input duct, said branch axes being angularly offset from said common central axis, comprising:

A. an outer section having a cross-section substantially the same as the cross-section of said input duct, said outer section having a central axis coaxial with said common axis and said outer section being coupled at one end to said end of said input duct, B. an inner section having a cross-section substantially the same as the cross-section of said output duct, said inner section having a central axis coaxial with said common axis, and said inner section being coupled at one end to said end of said output duct and extending into said outer section to define a shell region between said inner and outer sections, C. a plug means for sealing the end of said shell region adjacent to said output duct, D. channel means for establishing a plurality of channels in said shell region, said channels extending from a point near the end of said shell region adjacent to said input duct to an intermediate point within said shell region, whereby the portion of said shell region between said intermediate point and said plug means forms a common plenum, E. branch coupling means for coupling said plenum to said branch ducts.

2. Apparatus according to claim 1 wherein said channel means comprises a plurality of sound absorbing wedges having thickness substantially equal to the distance between said inner and outer sections, said wedges being disposed within said shell region.

3. Apparatus according to claim 2 wherein said input and output ducts have polygonal cross-sections at said sections to be coupled.

4. Apparatus according to claim 3 wherein said branch coupling means comprises a coupling whereby said branch ducts are joined to said outer section by butt joints to establish an airflow path between said plenum and the region interior to said branch duct.

5. Apparatus according to claim 2 wherein said branch coupling means comprises a coupling whereby said branch ducts are joined to said outer section by butt joints to establish an airflow path between said plenum and the region interior to said branch duct.

6. Apparatus according to claim 2 wherein said wedges are tapered.

7. Apparatus according to claim 1 wherein said branch coupling means comprises a coupling whereby said branch ducts are joined to said outer section by butt joints to establish an airflow path between said plenum and the region interior to said branch duct.

8. Apparatus according to claim 1 wherein said input and output ducts have cylindrical cross-sections at said ends to be coupled, whereby said plenum is annular.

9. Apparatus according to claim 8 wherein said channel means comprises a plurality of sound absorbing wedges having thickness substantially equal to the distance between said inner and outer sections, said wedges being disposed within said shell region and wherein said tapered wedges have a curved central axis whereby said channels have a substantially helical central axis.

10. Apparatus according to claim 9 wherein said wedges are uniformly distributed about said common central axis within said shell region.

11. Apparatus according to claim 9 wherein the direction of said helical channels at said intermediate point are approximately tangent to a plane passing through said annular plenum at said intermediate point, said plane being perpendicular to said inner section axis, and wherein said annular plenum has a characteristic flow direction about said outer section axis substantially tangent to said helical central axes at said intermediate point.

12. Apparatus according to claim 11 wherein said branch coupling means comprises a junction means for coupling air flowing in said flow direction of said annular plenum to said branch duct.

13. Apparatus according to claim 9 wherein said wedges are tapered.

* * * * *